United States Patent Office 3,226,424
Patented Dec. 28, 1965

3,226,424
PROCESS FOR PREPARING 2-LOWER ALKOXY-1,1-DICYANOETHYLENE AND 2-AMINO-1,1-DICYANOETHYLENE
Lester Mischa Jampolsky, Upper Montclair, N.J., Joseph Kiss, Basel, Switzerland, and Benjamin Pecherer, Montclair, and John Thomas Plati, Rutherford, N.J., assignors to Hoffmann-La Roche Inc., Nutley, N.J., a corporation of New Jersey
No Drawing. Filed Oct. 3, 1962, Ser. No. 227,994
2 Claims. (Cl. 260—465.5)

This invention relates to a new synthesis of 2-methyl-4-amino-5-cyanopyrimidine. More particularly, the invention relates to a new synthesis of certain intermediates useful in the synthesis of 2-methyl-4-amino-5-cyanopyrimidine, which latter compound is a key intermediate in the synthesis of vitamin $B_1$ (cf. Rosenberg, Chemistry and Physiology of the Vitamins, 105–110, 1942). Also, the invention relates to novel sequences of chemical reactions, said sequences being useful in the synthesis of vitamin $B_1$.

Various methods of preparing 2-methyl-4-amino-5-cyanopyrimidine are known to the prior art. For example, this compound can be obtained via the reaction of acetamidine with an alkoxymethylenemalononitrile such as ethoxymethylenemalononitrile (cf. R. Grewe, Z. physiol. Chem., 242, 89 (1936). In another method an acetimidate, such as ethyl acetimidate hydrochloride, is condensed with aminomethylenemalononitrile (cf. Hromatka, German Patent 667,990, November 24, 1938). This latter compound, i.e., aminomethylenemalononitrile, can be prepared from the aforementioned alkoxymethylenemalononitrile via treatment with ammonia (cf. Bergel et al., U.S.P. 2,375,185, May 8, 1945). In an alternative method an alkoxymethylenemalononitrile can be condensed with ammonia and an acetimidate to wield 2-methyl-4-amino-5-cyanopyrimidine (cf. Hromatka German Patent 670,635, January 23, 1939).

As is apparent from the above discussion, key intermediates in the preparative routes to 2-methyl-4-amino-5-cyanopyrimidine are alkoxymethylenemalononitrile and aminomethylenemalononitrile. The present invention particularly relates to a novel method for the synthesis of these compounds. In particular, the synthesis of this invention comprehends the preparation of these compounds from compounds not previously used for this purpose. Said compounds are 2-X-methylenemalononitrile wherein X can be chloro or bromo. The new routes to 2-methyl-4-amino-5-cyanopyrimidine provided by the use of this intermediate are illustrated by the following diagram:

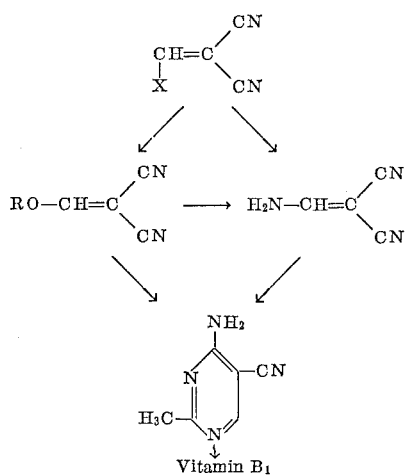

In the above flowsheet X is selected from the group consisting of bromo and chloro. 2-halomethylenemalononitriles (alternatively denoted as 1,1-dicyano-2-haloethylene) can be prepared by known methods from 1,2-dihalo-1,1-dicyanoethane by dehydrohalogenation at an elevated temperature (cf. Ardis, U.S.P. 2,774,783, December 18, 1956). Moreover, 1,2-dihalo-1,1-dicyanoethane can be prepared by the addition of halogen to 1,1-dicyanoethylene (cf. Ardis, supra). Hence, another embodiment of the instant invention comprehends a preparative route for the preparation of 2-methyl-4-amino-5-cyanopyrimidine from 1,1-dicyanoethylene (i.e., methylenemalononitrile).

In one embodiment of the invention 2-X-1,1-dicyanoethylene, wherein X is selected from the group consisting of bromo and chloro, is reacted with a lower alkanol, such as methanol or ethanol, to yield a 2-lower alkoxy-1,1-dicyanoethylene. This reaction is advantageously conducted at up to about 0° C. Of course, it can be conducted at higher temperatures, or partially at a lower temperature achieved by cooling and then partially at a higher temperature, such as at room temperature. The 2-lower alkoxy-1,1-dicyanoethylene produced can, by known methods discussed above, be converted into 2-amino-1,1-dicyanoethylene (i.e. aminomethylenemalononitrile) or directly into 2-methyl-4-amino-5-cyanopyrimidine.

Another embodiment of this invention comprehends reacting 2-X-1,1-dicyanoethylene, wherein X is selected from the group consisting of bromo and chloro, with ammonia, which reaction yields 2-amino-1,1-dicyanoethylene (i.e., aminomethylenemalononitrile). The reaction can be conducted in an organic solvent system, for example, a lower alkanol such as methanol or ethanol, or the reaction can be conducted in an aqueous system. The ammonolysis can be conducted using ammonia in any convenient form. Thus, for example, concentrated aqueous ammonia or alcoholic ammonia can be used. The temperature should be sufficiently low so as to not substantially volatilize the ammonia from the reagent being used. Pressure greater than atmospheric can also be used. The product obtained (i.e., 2-amino-1,1-dicyanoethylene) can be converted by known methods discussed above into 2-methyl-4-amino-5-cyanopyrimidine.

From the above, it will be appreciated that the instant invention comprehends the use of 2-X-1,1-dicyanoethylene, wherein X is selected from the group consisting of bromo and chloro, as an intermediate in the synthesis of vitamin $B_1$ (thiamine). The utilization of these intermediates, which heretofore have never been used in the synthesis of vitamin $B_1$, is achieved by displacement of the vinyl halogen and the formation of a compound known to be useful as an intermediate for 2-methyl-4-amino-5-cyanopyrimidine, a key intermediate in the synthesis of vitamin $B_1$. Thus, in one aspect, the instant invention comprehends the use of 1-chloro-2,2-dicyanoethylene as an intermediate in the synthesis of vitamin $B_1$. In another aspect, the instant invention comprehends the specific novel sequences of steps above outlined, as well as the specific novel conversions of 2-X-1,1-dicyanoethylene embodied therein.

The following examples are illustrative, but not limitative of the invention. Variations and modifications will be readily apparent to those skilled in the art, and such are included in the scope of the present invention. All temperatures are stated in degrees centigrade.

*Example 1*

5.0 g. of 2-chloro-1,1-dicyanoethylene was added with stirring to 20.0 ml. of absolute ethanol at 0°. The mixture was stirred for 15 minutes, and then 25.0 ml. of concentrated ammonia was added thereto. The reaction was exothermic, and the reaction mixture was stirred for two hours while being maintained at a temperature of from 4–6°. The yellowish brown solution was concentrated in vacuo at 40° (bath temperature), the solid residue dissolved in 35.0 ml. of water, decolorized with charcoal and cooled to 0°. The yellow-white crystals of 2-amino-1,1-dicyanoethylene were filtered off with suction and dried at 40° in vacuo. The mother liquor was concentrated in vacuo at 40° to 5–8 ml. and a second crop of 2-amino-1,1-dicyanoethylene was obtained therefrom.

The above preparation was also conducted using alcoholic ammonia in place of the concentrated aqueous ammonia.

*Example 2*

10.0 g. of 2-chloro-1,1-dicyanoethylene was added with stirring to 50.0 ml. of absolute methanol at 0°. The reaction mixture was stirred at 0° for 30 minutes, and then for 1 hour at room temperature, after which the reaction mixture was evaporated in vacuo at 40° and the residual crystals were dissolved in 30.0 ml. of hot ethyl acetate, filtered and permitted to crystallize after the addition of petroleum ether to the hot solution, yielding 2-methoxy-1,1-dicyanoethylene as white prisms melting at 95–96°.

*Example 3*

According to the method of Example 2, 2-ethoxy-1,1-dicyanoethylene (which melted at 71–72°) was prepared from 2-chloro-1,1-dicyanoethylene and absolute ethanol.

*Example 4*

According to the method of Example 2, 2-isopropoxy-1,1-dicyanoethylene was prepared from 2-chloro-1,1-dicyanoethylene and isopropanol. It melted at 47–48°, after crystallization from a mixture of ethyl acetate and petroleum ether.

Ammonolysis of each of the 2-methoxy, 2-ethoxy, and 2-isopropoxy-1,1-dicyanoethylene yielded 2-amino-1,1-dicyanoethylene.

We claim:
1. A process for the preparation of 2-amino-1,1-dicyanoethylene consisting essentially of reacting 2-X-1,1-dicyanoethylene, wherein X is selected from the group consisting of bromo and chloro, with alcoholic ammonia wherein the alcoholic component of said alcoholic ammonia is a lower alkanol, at a temperature below that at which the ammonia is substantially volatilized.

2. A process for the preparation of 2-lower alkoxy-1,1-dicyanoethylene consisting essentially of reacting 2-X-1,1-dicyanoethylene, wherein X is selected from the group consisting of bromo and chloro, with a lower alkanol at up to about room temperature.

References Cited by the Examiner
UNITED STATES PATENTS

| | | | |
|---|---|---|---|
| 2,384,106 | 9/1945 | Lichty | 260—465.6 |
| 2,774,783 | 12/1956 | Ardis | 260—465.7 |
| 2,942,022 | 6/1960 | Dickinson | 260—465.5 |
| 3,001,995 | 9/1961 | Frazza | 260—465.5 |
| 3,138,616 | 6/1964 | Scotti et al. | 260—465.6 X |
| 3,138,630 | 6/1964 | Scotti et al. | 260—465.5 X |

OTHER REFERENCES

Beilstein, Handbuch, 4th Ed., vol. 2, pages 416–17 (1920).

Gould, Mechanism and Structure in Organic Chemistry (New York, 1959), pages 250 and 283–4.

Rosenberg, Chemistry and Physiology of the Vitamins (New York, 1945), pages 104–118.

Wagner et al., Synthetic Organic Chemistry (New York, 1953), pages 226–8 and 665–6.

CHARLES B. PARKER, *Primary Examiner.*

NICHOLAS S. RIZZO, *Examiner.*